United States Patent [19]

Mori et al.

[11] Patent Number: 5,282,185

[45] Date of Patent: Jan. 25, 1994

[54] APPARATUS FOR GENERATING A DATA SIGNAL AT AN OPTIMAL PHASE

[75] Inventors: Takaro Mori, Chigasaki; Shigeru Nemoto, Yokohama, both of Japan

[73] Assignee: Victor Company of Japan, Ltd., Yokohama, Japan

[21] Appl. No.: 601,645

[22] Filed: Oct. 23, 1990

[30] Foreign Application Priority Data

Oct. 26, 1989 [JP] Japan .................. 1-279116

[51] Int. Cl.$^5$ .............................. G11B 7/00
[52] U.S. Cl. ....................... 369/48; 369/59; 369/44.32
[58] Field of Search .............. 369/32, 275.4, 44.26, 369/44.34, 54, 48, 58, 33, 44.32, 275.3, 59; 360/51, 37.1, 53

[56] References Cited

U.S. PATENT DOCUMENTS

| 4,564,929 | 1/1986  | Yonezawa et al. | 369/275.4 |
| 4,637,006 | 1/1987  | Bierhoff        | 369/59    |
| 4,713,802 | 12/1987 | Kobata et al.   | 369/59    |
| 4,872,155 | 10/1989 | Yokogawa et al. | 369/59    |
| 5,088,080 | 2/1992  | Ishibashi et al.| 369/59    |

FOREIGN PATENT DOCUMENTS 0311691  4/1989  European Pat. Off. .
63-244448 10/1988 Japan .

Primary Examiner—Aristotelis Psitos
Assistant Examiner—Nabil Hindi
Attorney, Agent, or Firm—Lowe, Price, LeBlanc & Becker

[57] ABSTRACT

An optical disk has regions in which sync signals are recorded. A data detection circuit detects data from a reproduced signal at a timing determined by a data detecting signal. A reproduced waveform of each sync signal is sampled at a first time point, and a first sample value representative thereof is generated. The reproduced waveform of each sync signal is sampled at a second time point different from the first time point, and a second sample value representative thereof is generated. The first and second sample values are compared, and a comparison signal representing a result of the comparing is generated. A phase of the data detecting signal is controlled in response to the comparison signal.

5 Claims, 3 Drawing Sheets (a)

(b)

(c)

(d)

APPARATUS FOR GENERATING A DATA SIGNAL AT AN OPTIMAL PHASE

BACKGROUND OF THE INVENTION

This invention generally relates to an apparatus for detecting data of a signal reproduced from an optical disk, and particularly relates to an apparatus for controlling a data detecting signal in an optical-disk data detecting system.

Some optical disks have recording tracks in which servo regions and data recording regions are alternately arranged in series. Information signals for servo control are previously recorded into the servo regions while data can be recorded into the data recording regions.

Such optical disks contain magneto-optic disks of the sampling servo type. In a magneto-optic disk of the sampling servo type, there inevitably occurs a phase difference between pits previously recorded in the servo regions and data of pits recorded in the data recording regions. In general, reproducing/recording systems for disks of this type are adjusted so as to minimize such a phase difference before being forwarded from a factory.

Japanese published unexamined patent application 63-244448 discloses a system for an optical disk. In the system of Japanese application 63-244448, during the recording of data, data detecting sync signals are also recorded into predetermined ones of the data recording regions of the optical disk. In addition, during the reproduction of the data from the optical disk, a data detecting signal for determining the timing of detection of the data is generated on the basis of the data detecting sync signals to realize a good recovery of the data.

The system of Japanese application 63-244448 includes a variable delay line which controls the delay amount of the data detecting signal so that sample values of signals reproduced from the servo regions and sample values of the data detecting sync signals reproduced from the data recording region will be equal in magnitude. In the system of Japanese application 63-244448, a close relation is not ensured between the equality of the magnitudes of the two sample signals and the nullification of a phase difference for various reasons such as a reason related to the use of different detecting devices for the two signals respectively, and a reason related to the dependence of the recording and reproducing levels of signals upon the sensitivity of an optical disk. In the system of Japanese application 63-244448, when the levels of the two signals are different from each other, there is no information representing which of the two signals should be delayed by the signal delay line and thus good servo control tends to be difficult. In the system of Japanese application 63-244448, when the envelopes of the reproduced data detecting sync signals are varied by low-cut characteristics of a signal transmission part of the system, good servo control can not be expected.

SUMMARY OF THE INVENTION

It is an object of this invention to provide an improved data detecting apparatus for an optical disk.

In a data detecting system for an optical disk having regions in which sync signals are recorded, the system comprising a sample circuit which samples a reproduced signal at a timing determined by a data detecting signal, an apparatus of this invention comprises means for sampling a reproduced waveform of each sync signal at a first time point and generating a first sample value representative thereof; means for sampling the reproduced waveform of each sync signal at a second time point different from the first time point and generating a second sample value representative thereof; means for comparing the first and second sample values and generating a comparison signal representing a result of said comparing; and means for controlling a phase of the data detecting signal in response to the comparison signal.

DESCRIPTION OF THE PREFERRED EMBODIMENT

Figure 1:
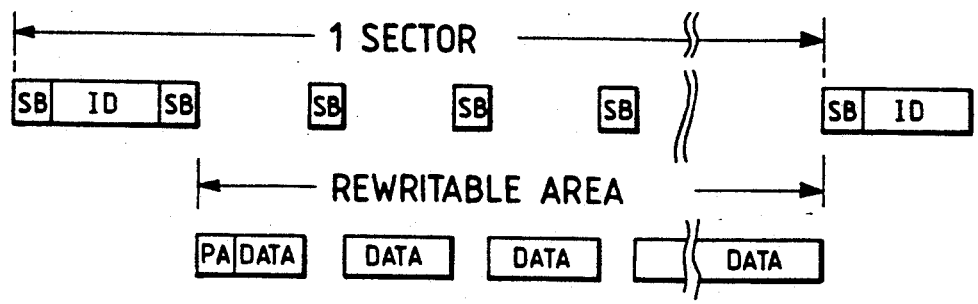
FIG. 1 is a diagram showing regions in an optical disk.

As shown in FIG. 1, each of sectors of an optical disk has servo regions SB and data recording regions which are alternately arranged in series. While the data recording regions extend between the servo regions SB, the second and later data recording regions are illustrated as being downwardly offset from the serve regions SB for an easy understanding in the drawing. In each sector, the servo regions SB prestores information signals which contain tracking information signals. In each sector, the first data recording region ID prestores an information signal including a sector sync pattern signal and an identification signal while the second and later data recording regions composing a rewritable area are used for storing data.

Figure 2:
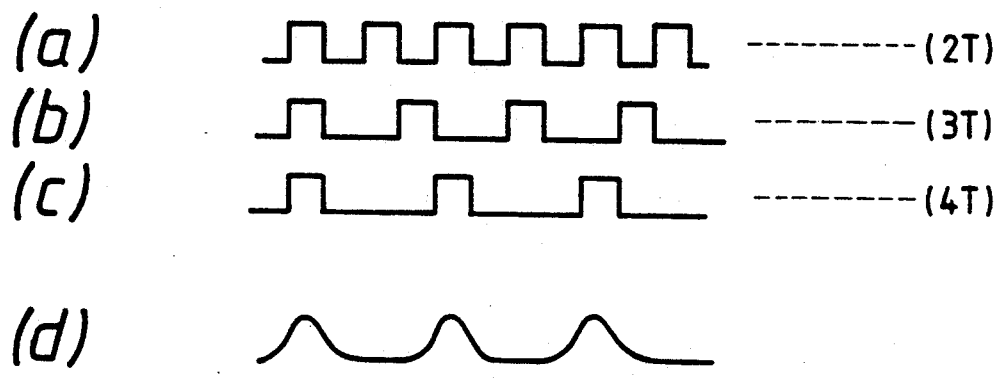
FIG. 2(a)–2(d) is a diagram showing the patterns of data detecting sync signals and the reproduced waveform of one of the data detecting sync signals.

During the recording of data into the optical disk, a data detecting sync signal (a preamble signal) PA is recorded into a head of the second data recording region in each sector while the data are recorded into the remaining part of the second data recording region and the third and later data recording regions in each sector. The data detecting sync signal PA is generated from a clock signal used for producing the data signal written in subsequent data areas within the sector. The pattern of the recording of the data detecting sync signals PA has a fixed frequency relation with pits in the optical disk. The data detecting sync signals PA can be selected from various types related to record patterns such as shown in the parts (a)–(c) of FIG. 2, where T denotes one period of the clock signal used for producing the data signal. That is, the data detecting signals have a high level at regular intervals of two or more integral times the period T of the clock signal. For example, when the data detecting sync signals PA have the pattern of the part (c) of FIG. 2, a reproduced signal corresponding to the data detecting sync signals PA has a waveform shown in the part (d) of FIG. 2.

It should be noted that, in this specification, "pit" means not only a hole from which material is dug out but also a magnetic mark where material is magnetized in a particular direction differently from the surroundings or an optical mark where the reflectivity of material is varied differently from the surroundings.

Figure 3:
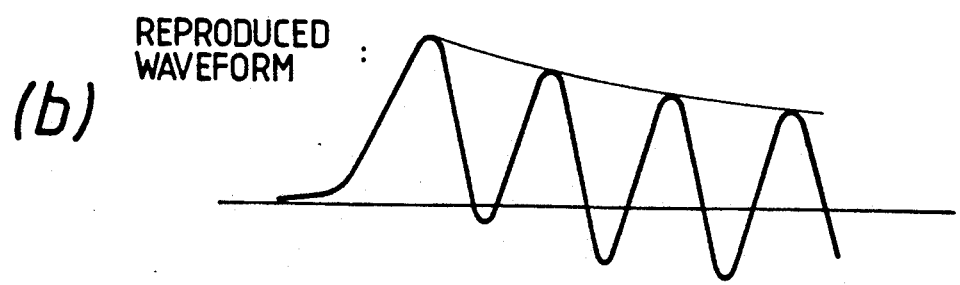
FIG. 3(a) and (b) is a diagram showing the relation between pits and the waveform of a corresponding reproduced signal.

Since a signal transmission path for transmitting a reproduced signal from the optical disk to a data detecting circuit includes an a.c. coupling, the signal transmission path has low-cut characteristics. Therefore, the envelope of the transmitted reproduced signal inputted into the data detecting circuit changes from the original envelope due to a transient phenomenon caused by the low-cut characteristics of the signal transmission path. For example, in the case where pits or spots are arranged at equal intervals as shown in the part (a) of FIG. 3, the envelope of a transmitted reproduced signal corresponding to these pits varies immediately after the start of reproduction as shown in the part (b) of FIG. 3. Such a transient change in the envelope of a transmitted reproduced signal is prevented from adversely affecting the generation of a data detecting signal.

Figure 4:
FIG. 4(a)–(d) is a diagram showing the relation among pits, the waveform of a corresponding reproduced signal, and the waveform of a data detecting signal.
Figure 4:
Figure 4:
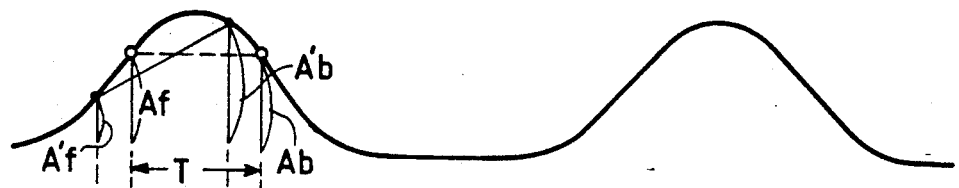
Figure 4:
Figure 4:

As shown in the part (a) of FIG. 4, data detecting sync signals are recorded into the optical disk as equally-spaced pits. During reproduction, the level of a reproduced signal corresponding to the data detecting sync signals varies in accordance with the pits as shown in the part (b) of FIG. 4. Specifically, the waveform of the reproduced signal has symmetrical knolls whose time positions correspond to the positions of the pits. The time position of the peak of each knoll agrees with the center of the corresponding pit.

As shown in the part (b) of FIG. 4, when the center of a pair of sample points spaced by one interval T is frontwardly offset from the center of a knoll of the reproduced signal, the obtained sample values Af' and Ab' of the reproduced signal are different from each other. In this case, the sample value Af' at the front sample point is smaller than the sample value Ab' at the rear sample point. When the center of the pair of the sample points is accorded with the center of the knoll of the reproduced signal, the obtained sample values Af and Ab of the reproduced signal are equal to each other. When the center of the pair of the sample points is rearwardly offset from the center of the knoll of the reproduced signal, the obtained sample values of the reproduced signal are different from each other. In this case, the sample value at the front sample point is greater than the sample value at the rear sample point. In this way, the obtained sample values of the reproduced signal represent the deviations of the positions of the sample point pair from the reference positions (the optimal positions) where the center of the sample point pair is in accord with the center of the knoll of the reproduced signal.

In general, the center of a wave of a data signal reproduced at a timing determined by a data detecting sync signal accurately corresponds to the center of the corresponding pit, that is, the optimal time position of data detection responsive to a data detecting signal. Therefore, in the case where the phase of the data detecting signal is controlled so that the sample values obtained at the previously-mentioned pair of the sample points are equal to each other, the detection of data can be performed well in timing.

During the reproduction of data, a clock signal is regenerated from reproduced signals corresponding to the servo regions SB. In addition, a data detecting signal is generated on the basis of this clock signal. The data detecting signal has a rectangular waveform of a predetermined period T as shown in the parts (c) and (d) of FIG. 4. The operation of detecting data is executed at the positive-going edge of each pulse in the data detecting signal. The part (c) of FIG. 4 shows the data detecting signal which has the optimal phase with respect to a wave of the reproduced signal. The part (d) of FIG. 4 shows the data detecting signal whose phase advances from the optimal phase. As will be made clear later, the previously-mentioned pair of the sample points corresponds to a pair of adjacent negative-going edges in the data detecting signal.

Figure 5:
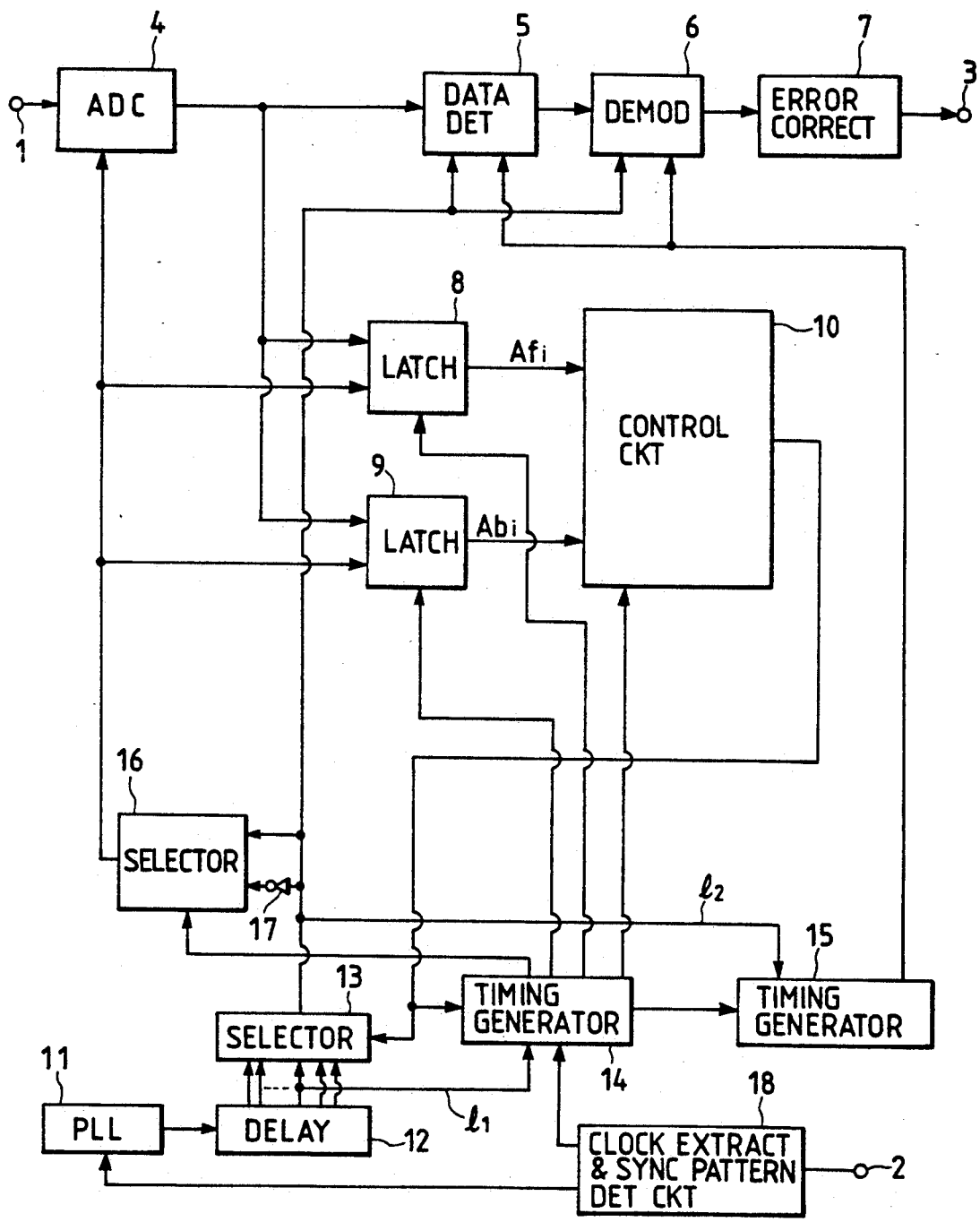
FIG. 5 is a block diagram of an apparatus according to an embodiment of this invention.

An apparatus according to an embodiment of this invention will now be described in detail with reference to FIG. 5. An analog signal reproduced from the optical disk is fed to an analog-to-digital converter 4 via an input terminal 1. The analog reproduced signal is converted by the analog-to-digital converter 4 into a corresponding digital reproduced signal which is fed to a data detection circuit 5 and latches 8 and 9. The analog-to-digital converter 4 samples the reproduced signal at a timing determined by the positive-going edge of each pulse in an output signal from a data selector 16. The analog-to-digital converter 4 digitizes the sampled signal, generating the digital reproduced signal.

The latches 8 and 9 are fed with latch enable signals from a timing signal generator 14. The latches 8 and 9 sample and hold the output digital signal from the analog-to-digital converter 4 at timings determined by the positive-going edges of every k pulses (where k is an integer more than one) of the output signal from the data selector 16. As will be made clear later, the sample timings of the latches 8 and 9 correspond to the previously-mentioned pair of the sample points respectively. The time durations of the application of the latch enable signals to the latches 8 and 9 are chosen so as to occur within the period during which the reproduced signal corresponds to a data detecting sync signal PA (see FIG. 1) of each sector of the optical disk. These time durations are determined on the basis of a sector sync pattern signal derived from the reproduced signal corresponding to the region ID (see FIG. 1) of each sector of the optical disk which stores the information signal containing the identification signal.

A selector 13 outputs a data detecting signal to the data selector 16, an inverter 17, the data detecting circuit 5, and a demodulation circuit 6. The output signal from the inverter 17 is applied to the data selector 16. The data selector 16 selects one of the data detecting signal and the inversion of the data detecting signal in response to a selection signal fed from the timing signal generator 14. During the period for which the reproduced signal corresponds to a data detecting sync signal PA (see FIG. 1) of each sector, the data selector 16 selects the inversion of the data detecting signal so that the output signal from the data selector 16 agrees with the inversion of the data detecting signal. During other periods, the data selector 16 selects the data detecting signal so that the output signal from the data selector 16 agrees with the data detecting signal.

A signal reproduced from the servo regions SB and the first data recording region ID (see FIG. 1) in each sector of the optical disk is fed to a clock extraction and sync pattern detection circuit 18 via an input terminal 2. The clock signal component extracted at the circuit 18 is supplied to a PLL (phase locked loop) 11, and a sector sync detection signal (pulse) is supplied to the timing signal generator 14 when the circuit detects the sector sync pattern in the signal reproduced from the first data recording region ID. The PLL 11 generates a reference signal on the basis of the reproduced clock signal. The reference signal has the same frequency as the frequency 1/T of the reproduced clock signal and a predetermined phase thereto. The reference signal is fed from the PLL 11 to a delay circuit 12. The delay circuit 12 includes a cascade combination of equal delay elements, delaying the reference signal by different delay times and generating a set of primary data detecting signals of different phases. The set of the primary data detecting signals is fed to the selector 13. The selector 13 selects one of the primary data detecting signals as the final data detecting signal in response to a selection signal fed from a control circuit 10. Accordingly, the delay time of the data detecting signal outputted from the selector 13 is varied by the selection signal fed from the control circuit 10. The selector 13 is designed so as to select intermediate one of the primary data detecting signals under an initial condition.

A predetermined, preferably central, one of the primary data detecting signals is fed from the delay circuit 12 to the timing signal generator 14 via a line 11. The timing signal generator 14 generates the selection signal, the latch enable signals, a timing signal, and a sync pulse signal on the basis of the input primary data detecting signal and the sector sync detection signal. The timing signal is fed from the timing signal generator 14 to the control circuit 10. The sync pulse signal is fed from the timing signal generator 14 to another timing signal generator 15.

The data detecting signal is fed from the selector 13 to the timing signal generator 15 via a line 12 as a clock signal having a variable delay time. The timing signal generator 15 generates a timing signal finely on the basis of the input clock signal and coarsely on the sector sync detection signal. The timing signal is fed from the timing signal generator 15 to the data detection circuit 5 and the demodulation circuit 6 as an initializing pulse for each byte and a latching pulse. The timing signal generator 15 can be synchronized with the timing signal generator 14 by the sync pulse signal fed from the timing signal generator 14.

Each of the timing generators 14 and 15 is composed of a counter which is reset by the sector sync detection signal from the circuit 18 or the sync pulse from the timing signal generator 14 and which counts the clock signal on the line 11 or 12, respectively, and a decoder which decodes the output of the counter.

The latch enable signals fed to the latches 8 and 9 from the timing signal generator 14 are offset in duration so that the output signal from the analog-to-digital converter 4 will be latched by the latches 8 and 9 at a former sample point and a later sample point composing a pair respectively. During the period for which the reproduced signal corresponds to a data detecting sync signal PA, the inversion of the data detecting signal is selected by the data selector 16 so that the reproduced signal is sampled by the latches 8 and 9 at the moments of the negative-going edges of adjacent pulses in the data detecting signal as shown in FIG. 4. The output signals Afi and Abi from the latches 8 and 9 are fed to the control circuit 10.

Figure 6:
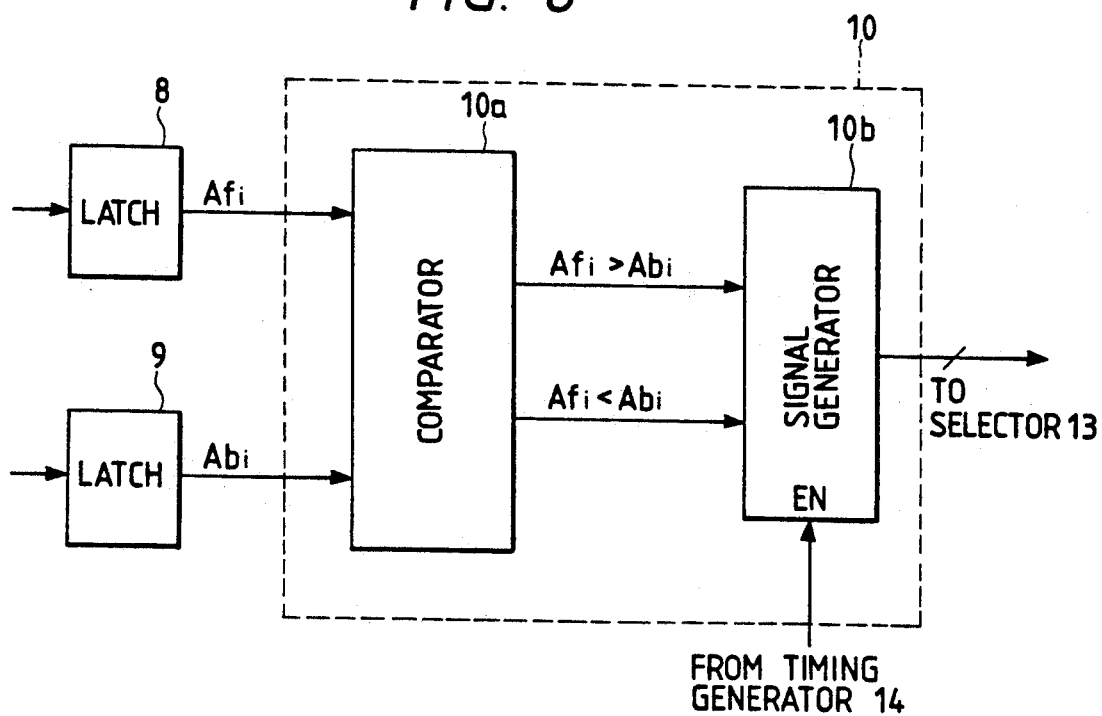
FIG. 6 is a block diagram of the control circuit of FIG. 5.

As shown in FIG. 6, the control circuit 10 includes a comparator 10a and a signal generator 10b. The comparator 10a compares the values of the output signals Afi and Abi from the latches 8 and 9. The comparator 10a output two signals. One of the output signals from the comparator 10a is activated when the value of the signal Afi is greater than the value of the signal Abi. The other of the output signals from the comparator 10a is activated when the value of the signal Afi is smaller than the value of the signal Abi. The output signals from the comparator 10a are fed to the signal generator 10b. The signal generator 10b (for which an up/down counter may be used) generates the selection signal in response to the output signals from the comparator 10a. As described previously, the delay time of the data detecting signal outputted from the selector 13 is varied by the selection signal fed from the control circuit 10. The selection signal is designed so that the delay time of the data detecting signal will be increased when the value of the signal Afi is smaller than the value of the signal Abi, and that the data detecting signal will be decreased when the value of the signal Afi is greater than the value of the signal Abi.

During the reproduction of data, the time segments of the reproduced signal which are sampled by the latches 8 and 9 are periodically updated for each data detecting sync signal. When the phase of the data detecting signal is frontwardly offset from the optimal phase, that is, when the value of the sampled signal Afi is smaller than the value of the sampled signal Abi (see FIG. 4), the delay time of the data detecting timing signal is increased by the operation of the control circuit 10 so that the phase of the data detecting signal will be moved toward the optimal phase. When the phase of the data detecting signal is rearwardly offset from the optimal phase, that is, when the value of the sampled signal Afi is greater than the value of the sampled signal Abi (see FIG. 4), the delay time of the data detecting timing signal is decreased by the operation of the control circuit 10 so that the phase of the data detecting signal will be moved toward the optimal phase. As a result of this feedback control, the phase of the data detecting signal is converged to the optimal phase. During the periods other than the period for which the reproduced signal corresponds to a data detecting sync signal PA, the updatings in the latches 8 and 9 are stopped by the timing signal generator 14 and the selector 13 continues to output one of the primary data detecting signals which is finally set during the reproduction of the data detecting sync signal PA, and the data detecting signal is selected by the data selector 16. In this case, as understood from the parts (a)-(c) of FIG. 4, when the data detecting signal is maintained at the optimal phase by the previously-mentioned feedback control, a positive-going edge in the data detecting signal concur with the peak of each reproduced signal wave corresponding to a pit so that the reproduced signal is sampled by the analog-to-digital converter 4 at a timing corresponding to the peak of each reproduced signal wave. In addition, the sampled value corresponds to the center of the pit and the sampled value accurately represents recorded information or data in the pit.

The output digital signal from the analog-to-digital converter 4 is processed by the data detecting circuit 5 so that recorded data can be restored. The restored data are demodulated by the demodulation circuit 6. The output data from the demodulation circuit 6 are subjected to error correction by a code error correction circuit 7. The error-free output data from the code error correction circuit 7 are transmitted to an external device (not shown) via an output terminal 3. Since the data detecting signal fed to the data detection circuit 5 and the demodulation circuit 6 has a correct phase as described previously, the data detection circuit 5 and the demodulation circuit 6 can reliably execute their operations.

What is claimed is:

1. In a data detecting system for an optical disk having regions in which sync signals are recorded, the system comprising a sample circuit which samples a reproduced signal at a timing determined by a data detecting signal, an apparatus comprising:

means for sampling a reproduced waveform of each sync signal at a first time point and generating a first sample value representative thereof;

means for sampling the reproduced waveform of each said sync signal at a second time point different from the first time point and generating a second sample value representative thereof, said first and second sample values having first and second respective levels;

means for comparing said first and second levels of the first and second sample values of the reproduced waveform of each said sync signal and generating a comparison signal representing a result of said comparing; and means for controlling a phase of the data detecting signal in response to the comparison signal.

2. The apparatus of claim 1 wherein the controlling means comprises means for generating primary signals having different phases, and means for selecting one of the primary signals as the data detecting signal in response to the comparison signal.

3. The apparatus of claim 1 wherein said comparing means comprises means for generating a first comparison signal when said first level of said first sample value is greater than said second level of said second sample value and for generating a second comparison signal when said first level of said first sample value is less than said second level of said second value, and said controlling means is responsive to said first and second comparison signals for controlling said phase of the data detecting signal.

4. The apparatus of claim 1, wherein the optical disk includes a plurality of pits positioned for synchronizing data reproduction, said apparatus including detecting means for detecting each of said plurality of pits and for providing a reproduced waveform for each said pit as said sync signal to said means for sampling the reproduced waveform at said first and second time points.

5. In a data detecting system for an optical disk having sectors, wherein each of the sectors has servo regions (SB) and data recording regions which are alternately arranged in series, wherein a first data recording region in each of the sectors prestores an information signal including an identification signal (ID), wherein during recording of data into the optical disk, a sync signal (PA) and a part of the data are recorded into the data recording regions in each of the sectors, wherein a recorded position of the sync signal (PA) precedes recorded positions of the data in each of the sectors, the system including a sample circuit which samples a reproduced signal at a timing determined by a data detecting signal, an apparatus comprising;

timing signal generating means for generating a first timing signal at a first time point in a time interval during which each sync signal (PA) is reproduced from a related data recording region, and for generating a second timing signal at a second time point in the time interval during which each sync signal (PA) is reproduced from the related data recording region, the second time point being different from the first time point;

first sampling means for sampling a reproduced waveform of each sync signal (PA) at the first time point in response to the first timing signal and generating a first sample value representative thereof;

second means for sampling the reproduced waveform of each sync signal (PA) at the second time point in response to the second timing signal and generating a second sample value representative thereof, said first and second sample values having first and second respective levels;

comparing means for comparing said first and second levels of the first and second sample values of the reproduced waveform of each same sync signal (PA) and generating a comparison signal representing a result of said comparing; and means for controlling a phase of the data detecting signal in response to the comparison signal.

* * * * *